(12) United States Patent
Chen

(10) Patent No.: US 6,405,270 B1
(45) Date of Patent: Jun. 11, 2002

(54) METHOD AND APPARATUS FOR INCREASING DATA RATES BETWEEN NODES OF A SERIAL BUS

(75) Inventor: Dao-Long Chen, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/392,039

(22) Filed: Sep. 8, 1999

(51) Int. Cl.[7] .......................... G06F 13/00; H04L 12/28
(52) U.S. Cl. .......................... 710/104; 713/1; 713/100; 370/256
(58) Field of Search .......................... 710/100, 104; 713/1, 100; 370/256, 254, 255

(56) References Cited

U.S. PATENT DOCUMENTS

| | | | |
|---|---|---|---|
| 5,280,587 A | | 1/1994 | Shimordaira et al. |
| 5,487,064 A | * | 1/1996 | Galand et al. .......... 370/392 |
| 5,495,479 A | * | 2/1996 | Galaand et al. .......... 370/238 |
| 5,504,757 A | | 4/1996 | Cook et al. |
| 5,559,967 A | | 9/1996 | Oprescu et al. |
| 5,617,430 A | * | 4/1997 | Angelotti et al. .......... 702/117 |
| 5,687,319 A | | 11/1997 | Cook et al. |
| 5,696,701 A | | 12/1997 | Burgess et al. |
| 5,724,517 A | | 3/1998 | Cook et al. |
| 5,793,366 A | | 8/1998 | Mano et al. |
| 5,802,286 A | | 9/1998 | Dere et al. |
| 5,815,678 A | | 9/1998 | Hoffman et al. |
| 5,847,771 A | | 12/1998 | Cloutier et al. |
| 6,031,819 A | * | 2/2000 | Croslin .......... 370/217 |

OTHER PUBLICATIONS

*1394 Technical Overview*, Found on Texas Instruments web page www.ti.com, 1999 Copyright.

* cited by examiner

Primary Examiner—Xuan M. Thai
(74) Attorney, Agent, or Firm—Maginot, Moore & Bowman

(57) ABSTRACT

A method of altering topology of a serial bus having a plurality of nodes interconnected in a tree topology in order to increase data rates between the plurality of nodes includes the step of obtaining a current topology representation of the serial bus which indicates a first node of the plurality of nodes is coupled to a second node of the plurality of nodes via a third node of the plurality of nodes. Another step of the method includes obtaining data rate capabilities of each node of the serial bus. The method further includes determining based upon the current topology representation of the serial bus and the data rate capabilities of each node that the third node of supports a third maximum data rate that is slower than a first maximum data rate supported by the first node and a second maximum data rate supported by the second node. Furthermore, the method includes generating in response to the determining step a new topology representation for the serial bus in which the third node is not coupled between the first node and the second node.

18 Claims, 3 Drawing Sheets

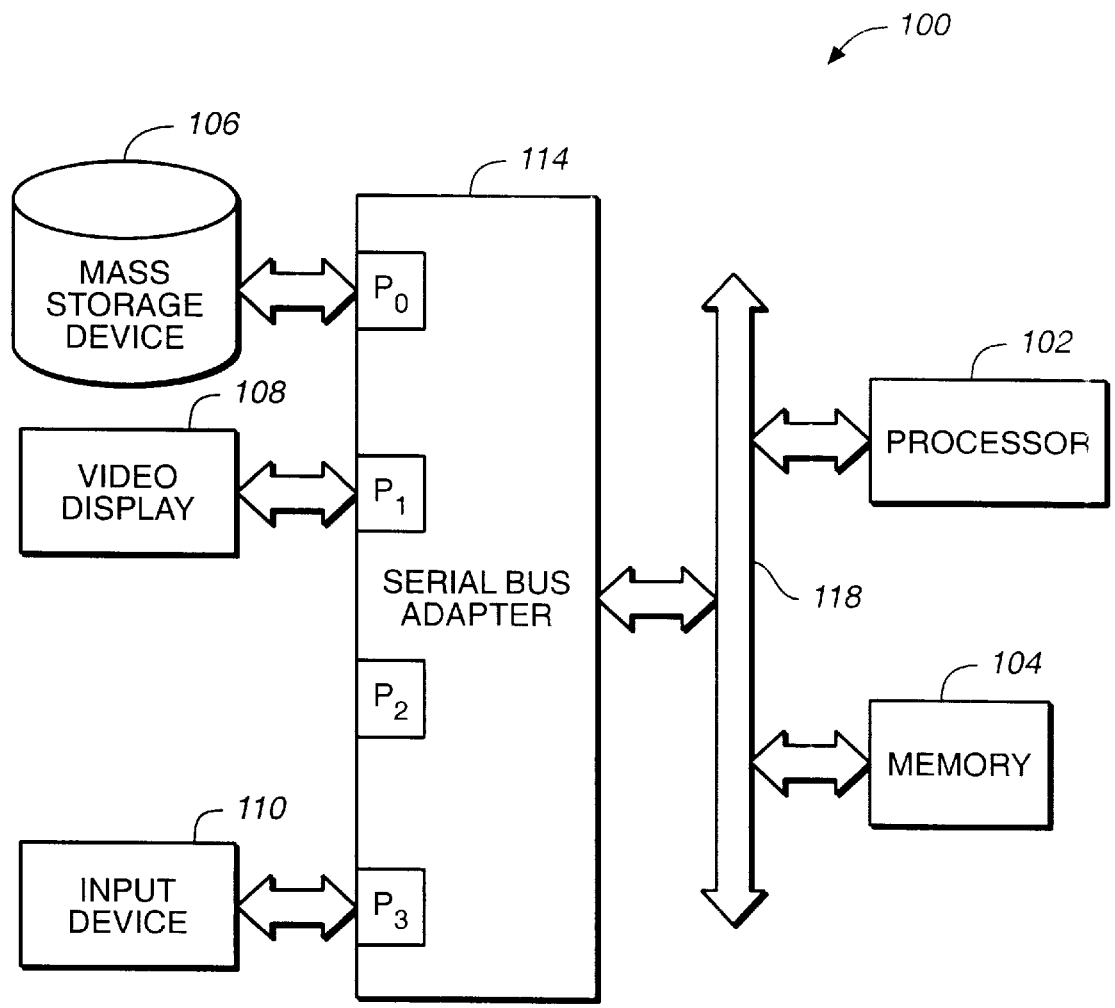
FIG._1

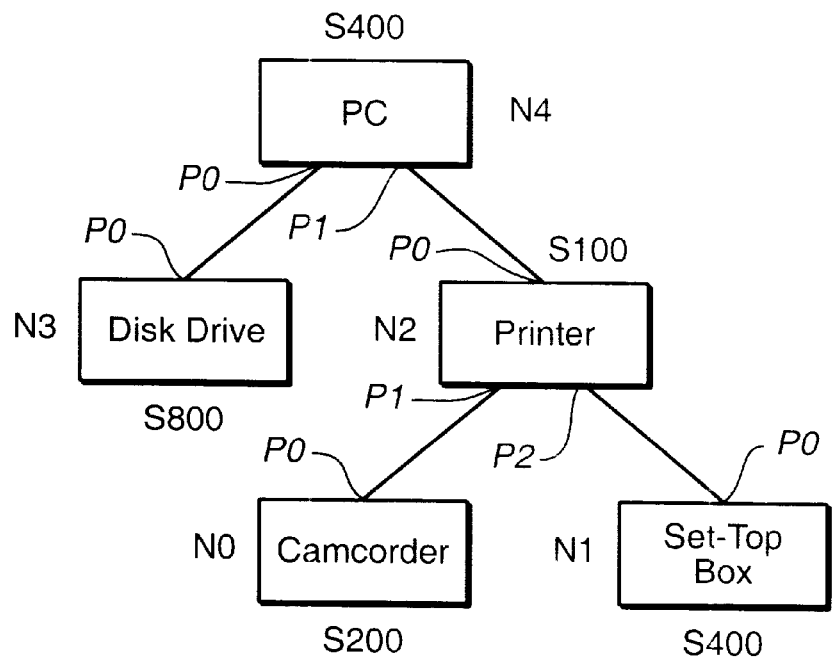
FIG._2
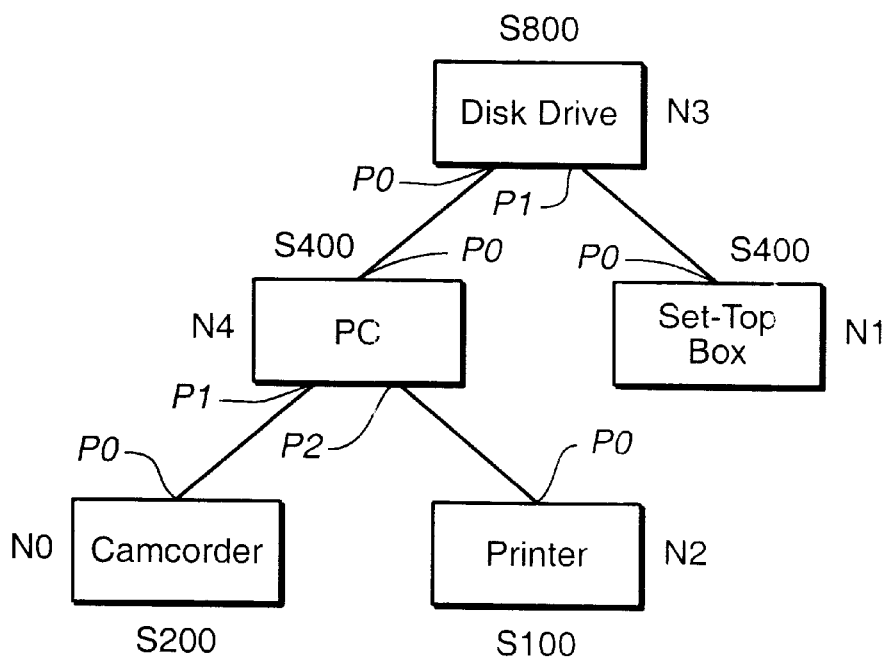
FIG._3

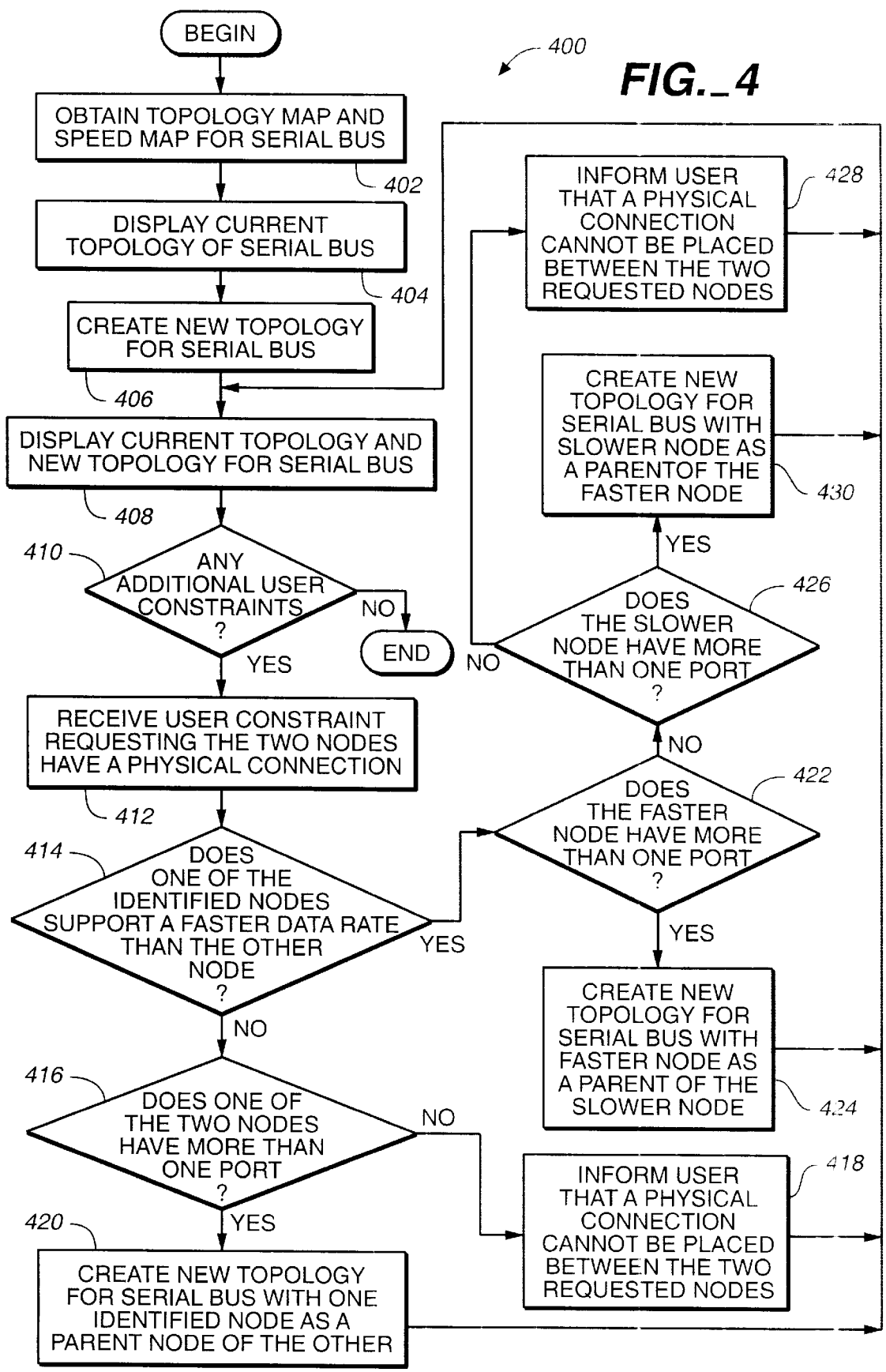
FIG._4

METHOD AND APPARATUS FOR INCREASING DATA RATES BETWEEN NODES OF A SERIAL BUS

BACKGROUND OF THE INVENTION

The present invention relates generally to data transmission, and more particularly to a method and apparatus for altering the topology of a serial bus in order to increase data rates between nodes of the serial bus.

The IEEE 1394 standard defines a high performance serial bus cable environment that includes a network of nodes connected by point-to-point links called physical connections. A physical connection consist of a port on each of two nodes and a cable between the ports of the two nodes. A node can have multiple ports which enables a branching multi-hop interconnection between nodes. The fixed round-trip time of the arbitration protocol limits the multi-hop interconnections between nodes. In an environment uses inexpensive interconnect cables having 28-gauge signal pairs, the default timing after a bus reset is adequate for 16 cable hops that are each 4.5 meters in length for a maximum distance between nodes of the 1394 serial bus of 72 meters.

Whenever a node is added to or removed from the 1394 serial bus, a bus reset occurs that forces all nodes to a known state. After a bus reset, a tree identify (ID) process translates the general network topology into a tree, where one node is designated a root and all of the physical connections are labeled as either a parent, a child, or as unconnected. Any unconnected ports are labeled as off and do not participate any further. The tree must be acyclic (i.e. no loops allowed); otherwise, the tree ID process will not be completed.

The 1394 environment supports multiple data rates of approximately 98.304, 196.61, 393.22, 786.43, 1,572.9, and 3,145.7 megabits per second which are commonly referred to as S100, S200, S400, S800, S1600, and S3200, respectively. The lowest speed, S100, is also known as the base rate, and all ports that support a higher data rate must also support the lower base rate. Nodes capable of data rates greater than the base rate exchange speed information with the other nodes through the attached ports during a speed signaling phase of normal bus arbitration. If a peer node is incapable of receiving data at a higher data rate, then the node will not propagated data received at the higher data rate down that path. In other words, nodes will only propagate high speed data down paths that support the higher data rate.

During data packet transmission, the source node sends a speed code, format and transaction codes, addresses of the source and destination nodes, and data. The destination field in the packet is used by the link layer of each node to determine if the corresponding node is the recipient of the transmitted data. The maximum speed at which a data packet can be transmitted depends upon the maximum supported speeds of the transmitting and receiving nodes as well as the maximum supported speeds of any nodes connected between the transmitting and receiving nodes. In particular, the maximum speed for data transmission is equal to the highest speed that is supported by the sending node, receiving node, and all the nodes connected between the sending node and the receiving node.

Since the maximum speed at which a data packet can be transmitted depends upon nodes connected between the sending node and the receiving node, the overall performance of the serial bus is dependent upon the topology of the serial bus. In other words, altering the manner by which nodes of the serial bus are interconnected via the physical connections may improve the overall performance of the serial bus if slower nodes connected between faster nodes are moved such the slower nodes are not connected between faster nodes. The problem is that typical computer users do not appreciate that the manner by which the nodes of the serial bus are interconnected effects the overall performance of the serial bus. Moreover, even if computer users appreciated this fact, typical computer users do not know how to obtain the maximum data rate supported by each node of their serial bus nor how to utilize the maximum data rate information to configure the serial bus for increased performance.

Accordingly, a need exists for a method and apparatus that increase overall bus performance of a serial bus by optimizing the manner by which nodes of the serial bus are interconnected.

SUMMARY OF THE INVENTION

In accordance with one embodiment of the present invention, there is provided a method of altering topology of a serial bus having a plurality of nodes interconnected in a tree topology in order to increase data rates between said plurality of nodes. One step of the method includes obtain a current topology representation of said serial bus which indicates a first node of said plurality of nodes is coupled to a second node of said plurality of nodes via a third node of said plurality of nodes. Another step of the method includes obtaining data rate capabilities of each node of said serial bus. The method also includes the step of determining based upon said current topology representation of said serial bus and said data rate capabilities of each node that said third node of supports a third maximum data rate that is slower than a first maximum data rate supported by said first node and a second maximum data rate supported by said second node. Furthermore, the method includes the step of generating in response to the determining step a new topology representation for said serial bus in which said third node is not coupled between said first node and said second node.

Pursuant to another embodiment of the present invention, there is provided a system for altering topology of a serial bus having a plurality of nodes interconnected in a tree topology in order to increase data rates between the plurality of nodes. The system includes a processor, a serial bus adapter operable to provide the processor with an interface to the plurality of nodes, and a memory comprising a plurality of instructions. The plurality of instructions when executed by the processor cause the processor to obtain a current topology representation of the serial bus via the serial bus adapter which indicates a first node of the plurality of nodes is coupled to a second node of the plurality of nodes via a third node of the plurality of nodes. Furthermore, the plurality of instructions when executed by the processor cause the processor to obtain data rate capabilities of each node of the serial bus via the serial bus adapter. Moreover, the plurality of instructions when executed by the processor cause the processor to generate a new topology representation for the serial bus in which the third node is not coupled between the first node and the second node in response to determining based upon the current topology representation of the serial bus and the data rate capabilities of each node that the third node supports a third maximum data rate that is slower than a first maximum data rate supported by the first node and a second maximum data rate supported by the second node.

Pursuant to another embodiment of the present invention, there is provided a computer readable medium for configuring a system for altering topology of a serial bus having a plurality of nodes interconnected in a tree topology in order to increase data rates between the plurality of nodes. The computer readable medium includes a plurality of instructions which when executed by the system cause the system to obtain a current topology representation of the serial bus which indicates a first node of the plurality of nodes is coupled to the second node of the plurality of nodes via a third node of the plurality of nodes. The plurality of instructions when executed by the system also cause the system to obtain data rate capabilities of each node of the serial bus. Moreover, the plurality of instructions when executed by the system further cause the system to generate a new topology representation for the serial bus in which the third node is not coupled between the first node and the second node in response to determining based upon the current topology representation and the data rate capabilities of each node that (i) the first node supports a first maximum data rate, (ii) the second node supports a second maximum data rate, and (iii) the third node of the serial bus supports a third maximum data rate that is slower than the first data rate and the second data rate.

It is an object of the present invention to provide an improved method and apparatus for configuring a serial bus.

It is also an object of the present invention to provide a new and useful method and apparatus for configuring a serial bus.

It is another object of the present invention to provide a method and apparatus for increasing data rates between nodes of a serial bus.

It is yet another object of the present invention to provide a method and apparatus for altering the topology of a serial bus in order to increase data rates between nodes of the serial bus.

The above and other objects, features, and advantages of the present invention will become apparent from the following description and the attached drawings.

BRIEF DESCRIPTION OF THE DRAWINGS

FIG. 1 shows a block diagram of a system which incorporates various features of the present invention therein;

FIG. 2 shows a serial bus topology in which a data rate between a sending node and a receiving node is limited by an intervening node;

FIG. 3 shows a serial bus topology in which data rates between any sending node and receiving node are not limited by intervening nodes; and FIG. 4 shows a flowchart a serial bus configuration method implemented by the system of FIG. 1.

DETAILED DESCRIPTION OF A PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

FIG. 1 illustrates a system 100 which incorporates features of the present invention therein. In particular, the system 100 includes a processor 102, memory 104, mass storage device 106, video display 108, and input device 110. Moreover, the system 100 includes a serial bus adapter 114 operable to provide a data path between the mass storage device 106, the video display 108, the input device 110, and a system bus 118. The system bus 118 operably couples the processor 102 to the memory 104 and the serial bus adapter 114.

The memory 104 includes random access memory (RAM) such as SRAM (static RAM), DRAM (dynamic RAM), and SDRAM (synchronous DRAM) which store software routines obtained from computer readable medium such as a floppy disk, CD-ROM disc, DVD disc, and hard disks. The memory 104 may also include nonvolatile computer readable medium such as PROM (programmable read only memory), EPROM (electrically PROM), EEPROM (electrically erasable PROM), and flash memory that store firmware routines. In particular, the memory 104 stores software and/or firmware routines which, when executed by the processor 102, cause the processor 102 to create a new topology for the nodes (e.g. mass storage device 106, video display 108, and input device 110) attached to the serial bus adapter 114.

The processor 102 is operable to execute the software and/or firmware routines stored in the memory 104, and communicate with the mass storage device 106, the video display 108, and the input device 110 via the serial bus adapter 114. Most importantly, the processor 102 is operable to execute software and/or firmware routines of the memory 104 which cause the processor 102 to create a new topology for interconnecting the nodes attached to the serial bus adapter 114 in order to increase data rates between nodes of the serial bus.

The exemplary serial bus adapter 114 includes four ports $P_0$, $P_1$, $P_2$, and $P_3$ that are operable to physically link the serial bus adapter 114 to nodes via interconnect cables. In general, the serial bus adapter 114 is operable to provide an interface between nodes attached to the ports $P_0$, $P_1$, $P_2$, and $P_3$ and the processor 102. For example, as depicted in FIG. 1, the serial bus adapter 114 is operable to provide an interface between the processor 102 and the mass storage device 106, the video display 108, and the input device 110 which are respectively coupled to the ports $P_0$, $P_1$, and $P_3$ of the serial bus adapter 114. In an exemplary embodiment, the serial bus adapter 114 is implemented with an IEEE 1394 serial bus adapter that provides the processor 102 with an interface to nodes attached to an IEEE 1394 serial bus.

FIG. 2 and FIG. 3 depict two possible interconnection schemes or topologies for the nodes of an exemplary IEEE 1394 serial bus. In particular, FIG. 2 depicts a tree topology in which data packets transferred from a sending node (e.g. PC) to a receiving node (e.g. Set-Top Box) of the IEEE 1394 serial bus must be transferred at a slower data rate than the maximum data rate supported by both the sending node and the receiving node due to a slower node (e.g. Printer) being interconnected between the sending node and receiving node. In contrast, FIG. 3 depicts a tree topology of the same nodes of FIG. 2 interconnected in such a manner that no slower node is connected between faster nodes of the IEEE 1394 bus. Accordingly, data packets may be transferred at the fastest data rate supported by both the sending node and receiving node.

Referring now to FIG. 4, there is shown a flowchart of a configuration method 400 implemented by the system 100 in order to increase data rates between nodes of the serial bus. In an exemplary embodiment, the system 100 executes the configuration method 400 after a bus reset and interrupt which may be generated in response to adding a node to the serial bus, removing a node from the serial bus, or initially powering up the serial bus. In step 402, the system 100 obtains a speed map and topology map from the bus manager for the serial bus. As defined by the IEEE 1394 High Performance Serial Bus standard which is hereby incorporated by reference, the bus manager for the serial bus maintains information about the nodes connected to the serial bus. In particular, the serial bus maintains a topology map that represents the interconnections between nodes of the serial bus and a speed map that indicates the supported transfer speeds of each node attached to the serial bus.

It should be appreciated that instead of obtaining the topology map and the speed map from the bus manager, the system 100 may alternatively generate the topology map and the speed map from information obtained from nodes attached to the serial bus. For example, a method of generating a topology map that is representative of the interconnections between nodes of the serial bus is disclosed in Method for Generating a Topology Map for a Serial Bus, U.S. Pat. No. 5,724,517 to Cook et al., the disclosure of which is hereby incorporated by reference. Furthermore, a method of generating a speed map is described in Method for Selecting Transmission Speeds for Transmitting Data Packets over a Serial Bus, U.S. Pat. No. 5,504,757 to Cook et al., the disclosure of which is hereby incorporated by reference.

After obtaining the topology map and speed map, the system 100 in step 404 displays the current topology of the nodes of the serial bus. In an exemplary embodiment, the system 100 generates a graphical representation of the current topology of the serial bus, the highest supported data rate of each node of the serial bus, and the ports of each node of the serial bus. Moreover, in an exemplary embodiment, the system 100 further generates the graphical representation of the current topology such that the graphical representation further includes unique identifiers for each node of the serial bus. For example, the system 100 in an exemplary embodiment further displays the IEEE 1394 node ID assigned to each node of the IEEE 1394 bus during a tree ID process of the IEEE 1394 protocol. An exemplary graphical representation of a current topology is shown in FIG. 2.

After displaying the current topology of the serial bus, the system 100 in step 406 creates an new topology for the serial bus in an attempt to increase the performance of the serial bus. In general, the system 100 in an exemplary embodiment generates a new tree topology for the serial bus in which the slower nodes are moved toward the leafs of the tree topology and the faster nodes are moved toward the root of the tree topology. Assuming that each node includes at least three ports $P_0, P_1, \ldots P_3$, the system 100 is operable to generate from the current topology, a binary tree topology in which each node, except the root node, has a physical connection to a parent node that supports a data rate at least as fast as the fastest data rate supported by the node. As a result of generating the tree topology in this manner, the system 100 is operable to generate a new topology for the serial bus in which no slower node is connected between two faster nodes. For example, FIG. 3 illustrates a tree topology in which each parent node supports a data rate that is at least as fast as the fastest data rate supported by the child nodes attached thereto.

It should be appreciated by those skilled in the art that the system 100 may obtain the new topology by sorting the nodes based upon the fastest data rate supported by each node. Moreover, those skilled in the art should appreciate that for certain bus configurations the system 100 may be unable to obtain a new topology in which no slower node is between two faster nodes. One factor which may limit the system 100 from obtaining such an optimized topology is that some nodes attached to the serial bus may include less than three ports (e.g. one port or two ports). If each node includes at least two ports, the system 100 is still operable to obtain a new topology in which no slower node is connected between two faster nodes. However, if several of the nodes include only one port thus forcing those respective nodes to be leaf nodes of the resulting tree topology, then the system 100 may be unable to obtain a new topology in which no slower node is connected between two faster nodes. Even in such a situation, the system 100 is generally still operable to obtain a new topology in which few slower nodes are connected between faster nodes.

After obtaining the new topology for the nodes of the serial bus, the system 100 in step 408 generates a graphical representation of the new topology of the serial bus. In particular, the system 100 causes a graphical representation of the new topology (e.g. FIG. 3) and a graphical representation of the current topology (e.g. FIG. 2) to be displayed simultaneously upon the video display 108. More specifically, in an exemplary embodiment the system 100 further generates the graphical representation of the new topology such that the graphical representation further includes the highest supported data rate of each node of the serial bus, the ports of each node of the serial bus, and a unique identifier for each nod.

Then in step 410, the system 100 determines whether there are any additional user constraints to be placed upon the new topology. In an exemplary embodiment, the system 100 is operable to receive user input via the input device 100 which indicates whether the user desires to place any constraints upon the new topology. For example, the user may indicate via the input device 110 and a graphical user interface of the system 100 whether the user is satisfied with the generated new topology or whether the user would like to place additional constraints upon the new topology.

If the system 100 determines in step 410 that there are no additional user constraints to be placed upon the new topology, then the configuration method 400 ends. However, if the system 100 determines in step 410 that there are additional user constraints to be placed upon the new topology, then the system 100 continues to step 412.

In step 412, the system 100 receives additional user constraints. In general, a user may place additional constraints upon the new topology by identifying two nodes of the new topology which the user prefers to be directly coupled to one another. For example, a user via a pointing device such as a mouse may select two nodes of the new topology which the user prefers to be directly coupled to one another. Alternatively, a user via a keyboard may provide the system 100 with unique identifies for each of the two nodes that the user prefers to be directly coupled to one another.

In step 414, the system 100 determines whether either identified node supports a higher data rate than is supported by the other identified node. If the system 100 determines that one of the identified nodes supports a higher data rate than is supported by the other identified node, then the system 100 proceeds to step 422. However, if the highest data rate supported by each of the two identified nodes is the same, then the system 100 proceeds to step 416.

In step 416, the system 100 determines whether at least one of the two identified nodes includes at least two ports. If each of the two identified nodes includes only one port, then the two nodes do not include enough ports to be directly coupled to each other and to the other nodes of the serial bus. Accordingly, if at least one of the two identified nodes does not include at least two ports, then the system 100 in step 418 informs the user that the two identified nodes cannot be directly coupled to each other and returns to step 408.

However, if the system 100 determines that at least one of the two identified nodes includes at least two ports, then the system 100 in step 420 generates a new topology for the serial bus based upon the user constraint of keeping the two identified nodes together. In particular, the system 100 in an exemplary embodiment generates the new topology by making one node of the two identified nodes that includes at least two ports a parent node of the other identified node and treating the two identified nodes as a single node during the process of creating the new topology for the serial bus. After obtaining the new topology for the serial bus, the system returns to step 408 in order to display the new topology for the serial bus.

If the system 100 determines in step 414 that one of the identified nodes supports a higher data rate than is supported by the other identified node, then the system 100 in step 422 determines whether the node that supports the higher data rate includes more than one port. If the node that supports the higher data rate includes more than one port, then the system 100 in step 424 generates a new topology for the serial bus by making the node that does not support the higher transfer rate a leaf node (i.e. a node with no children) of the node that supports the higher transfer rate and treating the two identified nodes as a single node during the process of creating the new topology for the serial bus. After obtaining the new topology for the serial bus, the system 100 returns to step 408 in order to display the new topology for the serial bus.

If the system 100 determines in step 422 that the faster node does not include more than one port, then the system 100 in step 426 determines whether the slower node includes more than one port. If the slower node includes only one port, then the two identified nodes do not include enough ports to be directly coupled to each other and to the other nodes of the serial bus. Accordingly, the system 100 in step 428 informs the user that the two identified nodes cannot be directly coupled to each other and returns to step 408. Conversely, if the slower node does include more than one port, then the system 100 proceeds to step 430.

In step 430, the system 100 generates a new topology for the serial bus based upon the user constraint of having the two identified nodes directly coupled to one another. To this end, the system 100 generates the new topology by making the faster node a leaf node of the slower device and treating the two identified nodes as a single node during the during the process of creating the new topology for the serial bus. After obtaining the new topology for the serial bus, the system 100 returns to step 408 in order to display the new topology for the serial bus.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of altering topology of a serial bus having a plurality of nodes interconnected in a tree topology in order to increase data rates between said plurality of nodes, comprising the computer-implemented steps of:

a) obtaining a current topology representation of said serial bus which indicates a first node of said plurality of nodes is coupled to a second node of said plurality of nodes via a third node of said plurality of nodes;

b) obtaining data rate capabilities of each node of said serial bus;

c) determining based upon said current topology representation of said serial bus and said data rate capabilities of each node that said third node of supports a third maximum data rate that is slower than a first maximum data rate supported by said first node and a second maximum data rate supported by said second node; and d) generating in response to step (c), a new topology representation for said serial bus in which said third node is not coupled between said first node and said second node.

2. The method of claim 1, wherein:
   step (c) further comprises the step of determining that said second node includes at least a first port and a second port, and
   step (d) further comprises the step of generating said new topology representation such that said new topology representation indicates that said first node should be directly coupled to said first port of said second node and said third node should be directly coupled to said second port of said second node.

3. The method of claim 1, wherein:
   step (c) further comprises the step of determining that said first node includes at least a first port and a second port, and
   step (d) further comprises the step of generating said new topology representation such that said new topology representation indicates that said second node should be directly coupled to said first port of said first node and said third node should be directly coupled to said second port of said first node.

4. The method of claim 1, wherein step (d) further comprises the step of:
   generating said new topology representation such that said new topology representation indicates that said third node should be directly coupled to a fourth node of said serial bus.

5. The method of claim 1, further comprising the step of receiving at least one user defined constraint for said tree topology of said serial bus, wherein step (d) further comprises the step of:
   generating said new topology representation based upon said at least one user defined constraint.

6. The method of claim 1, further comprising the step of receiving at least one user defined constraint that indicates that said third node should be directly coupled to said second node, wherein:
   step (c) further comprises the step of determining that said second node includes at least a first port and a second port, and
   step (d) further comprises the step of generating said new topology representation such that said new topology representation indicates that said first node should be directly coupled to said first port of said second node and said third node should be directly coupled to said second port of second node.

7. A system for altering topology of a serial bus having a plurality of nodes interconnected in a tree topology in order to increase data rates between said plurality of nodes, comprising
   a processor;
   a serial bus adapter operable to provide said processor with an interface to said plurality of nodes; and
   a memory comprising a plurality of instruction which when executed by said processor cause said processor to:

a) obtain a current topology representation of said serial bus via said serial bus adapter which indicates a first node of said plurality of nodes is coupled to a second node of said plurality of nodes via a third node of said plurality of nodes;
b) obtain data rate capabilities of each node of said serial bus via said serial bus adapter;
c) generate a new topology representation for said serial bus in which said third node is not coupled between said first node and said second node in response to determining based upon said current topology representation of said serial bus and said data rate capabilities of each node that said third node supports a third maximum data rate that is slower than a first maximum data rate supported by said first node and a second maximum data rate supported by said second node.

8. The system of claim 7, wherein said memory further includes instructions which when executed by said processor further cause said processor to:
   determine that said second node includes at least a first port and a second port, and
   generate said new topology representation such that said new topology representation indicates that said first node should be directly coupled to said first port of said second node and said third node should be directly coupled to said second port of said second node.

9. The system of claim 7, wherein said memory further includes instructions which when executed by said processor further cause said processor to:
   determine that said first node includes at least a first port and a second port, and
   generate said new topology representation such that said new topology representation indicates that said second node should be directly coupled to said first port of said first node and said third node should be directly coupled to said second port of said first node.

10. The system of claim 7, wherein said memory further includes instructions which when executed by said processor further cause said processor to:
    generate said new topology representation such that said new topology representation indicates that said third node should be directly coupled to a fourth node of said serial bus.

11. The system of claim 7, wherein said memory further includes instruction which when executed by said processor further cause said processor to:
    receive at least one user defined constraint for said tree topology of said serial bus, and
    generate said new topology representation based upon said at least one user defined constraint.

12. The system of claim 7, wherein said memory further includes instructions which when executed by said processor further cause said processor to:
    receive at least one user defined constraint that indicates that said third node should be directly coupled to said second node,
    determine that said second node includes at least a first port and a second port, and
    generate said new topology representation such that said new topology representation indicates that said first node should be directly coupled to said first port of said second node and said third node should be directly coupled to said second port of second node.

13. A computer readable medium for configuring a system for altering topology of a serial bus having a plurality of nodes interconnected in a tree topology in order to increase data rates between said plurality of nodes, comprising a plurality of instructions which when executed by said system cause said system to:
    a) obtain a current topology representation of said serial bus which indicates a first node of said plurality of nodes is coupled to said second node of said plurality of nodes via a third node of said plurality of nodes;
    b) obtain data rate capabilities of each node of said serial bus; and
    c) generate a new topology representation for said serial bus in which said third node is not coupled between said first node and said second node in response to determining based upon said current topology representation and said data rate capabilities of each node that (i) said first node supports a first maximum data rate, (ii) said second node supports a second maximum data rate, and (iii) said third node of said serial bus supports a third maximum data rate that is slower than said first data rate and said second data rate.

14. The computer readable medium of claim 13, wherein said plurality of instructions when executed by said system further cause said system to:
    determine that said second node includes at least a first port and a second port, and
    generate said new topology representation such that said new topology representation indicates that said first node should be directly coupled to said first port of said second node and said third node should be directly coupled to said second port of said second node.

15. The computer readable medium of claim 13, wherein said plurality of instructions when executed by said system further cause said system to:
    determine that said first node includes at least a first port and a second port, and
    generate said new topology representation such that said new topology representation indicates that said second node should be directly coupled to said first port of said first node and said third node should be directly coupled to said second port of said first node.

16. The computer readable medium of claim 13, wherein said plurality of instructions when executed by said system further cause said system to:
    generate said new topology representation such that said new topology representation indicates that said third node should be directly coupled to a fourth node of said serial bus.

17. The computer readable medium of claim 13, wherein said plurality of instructions when executed by said system further cause said system to:
    receive at least one user defined constraint for said tree topology of said serial bus, and
    generate said new topology representation based upon said at least one user defined constraint.

18. The computer readable medium of claim 13, wherein said plurality of instructions when executed by said system further cause said system to:
    receive at least one user defined constraint that indicates that said third node should be directly coupled to said second node,
    determine that said second node includes at least a first port and a second port, and
    generate said new topology representation such that said new topology representation indicates that said first node should be directly coupled to said first port of said second node and said third node should be directly coupled to said second port of second node.

* * * * *